Figure 1:
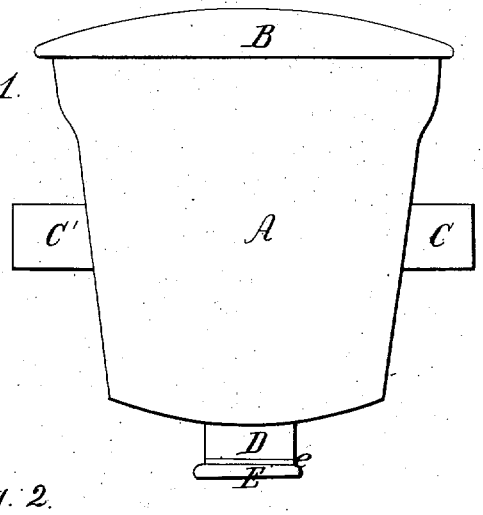

S. Bidwell.

Gas Regulator.

No. 1,018. Reissued July 31. 1860.

Witnesses;
Chas. McGauran
J. H. Eagle

Inventor;
Salmon Bidwell

UNITED STATES PATENT OFFICE.

SALMON BIDWELL, OF NEW YORK, N. Y., ASSIGNOR, BY MESNE ASSIGNMENTS, TO NEW YORK CAR AND STEAMBOAT GAS COMPANY.

IMPROVEMENT IN GAS-REGULATORS.

Specification forming part of Letters Patent No. 21,544, dated September 21, 1858; Reissue No. 1,018, dated July 31, 1860.

*To all whom it may concern:*

Be it known that I, SALMON BIDWELL, formerly of the city of Chicago in the county of Cook and State of Illinois, but now residing in the city and county of New York, and State of New York, have invented a new and useful Improvement in Gas-Regulators; and I do hereby declare that the following is a full and correct description thereof, reference being had to the drawings annexed, making a part of this specification, and to the letters of reference thereon.

Various devices have been contrived and patented before my invention for the purpose of regulating the flow of illuminating-gas to the burners from a supply-pipe connected with a gas holder or a portable vessel containing compressed gas. Some of these devices have many things in common with my improved regulator. They have a variable or extensible chamber into which the gas is admitted, and through which it passes on its way to the burners. The movable part of the variable chamber is controlled, antagonistically to the pressure of the admitted gas, by a spring, or its equivalent, which permits only of the extension of the size of the variable chamber when the pressure of the gas exceeds the force of the spring, or its equivalent, which is the governor or measure of the amount of pressure at which gas shall be uniformly supplied to the burners. The movable part of such variable chambers has heretofore been connected to a conical plug or valve having a reciprocating motion in a passage connecting the gas-holder with the variable chamber, the opening being provided with a reverse conical seat, against which the valve takes when closed by the action of the variable chamber. In some of the said former contrivances the motion of the valve when closing or partially closing is in the direction of, and in others in an opposite direction to, the movement of the gas, and in some double or balanced valves are used for the purpose of preventing the gas from acting directly to move the valve in either direction. Regulating-valves so constructed and operated are defective and inoperative to a great extent, if not entirely, for the purpose of regulating the flow of illuminating-gas from vessels wherein it is compressed frequently to the extent of three hundred pounds to the superficial inch, because the movement of the valve increases or diminishes the size of the opening too rapidly to admit of proper control.

My said improvement is designed more especially to remedy this defect in regulators used for the purpose of controlling the flow of gas under heavy pressure from portable vessels; but it may also be used for ordinary purposes by constructing and adjusting the parts with sufficient delicacy.

It consists in controlling the passage-way or supply-pipe leading from the portable vessel or other source of supply to the variable chamber by the action of a stop-cock forming a part of such passage-way and connected in any suitable manner with the movable part of the variable chamber, such movable part being controlled, antagonistically to the pressure of the admitted gas, by a spring or its equivalent. By the use of a stop-cock, properly fitted, in this manner the passage-way, and consequently the supply of admitted gas to the chamber, is very much more perfectly controlled than by the valve formerly used.

I am aware that a gate is described in connection with a variable chamber in the English patent of H. F. Bacon; but the gate being employed only to control the quantity of gas passing from the variable chamber, instead of controlling the passage from the portable vessel or other source of supply to the variable chamber, the apparatus is inoperative and useless for the purpose of regulating the flow of gas under varying pressure, or under considerable pressure.

The pressure of gas compressed in portable vessels constantly decreases in a ratio proportionate to the quantity consumed, and therefore the regulator must be so constructed as to gradually enlarge the passage from the portable vessel to the variable chamber, and at the same time have capacity to meet the fluctuations of pressure caused by varying the number of burners used or the quantity of gas consumed by them.

The drawings illustrate the form of construction I have adopted and consider best adapted to embody my invention; but it will be evident to any skillful mechanic that variations and modifications in construction may be made without changing essentially the character or utility of the apparatus.

Figure 2:
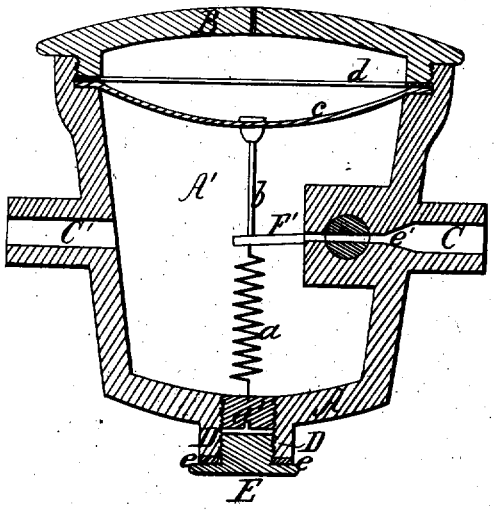
Figure 3:
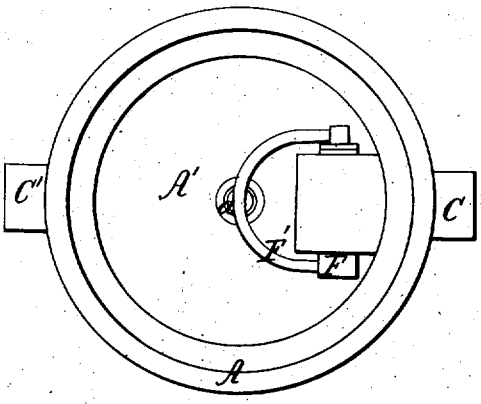

Figure 1 of the drawings represents an exterior side elevation; Fig. 2, a vertical cut section; Fig. 3, a plan view, with both rigid and flexible covers removed.

Letter A′ represents a variable chamber inclosed at the sides and bottom by the rigid walls A, and at top by the flexible cover *c*, which may be made of india-rubber or any suitable material, and confined to the rigid sides by the rigid cover B and washer *d*, as shown, or in any other suitable manner. Letter C′ is the eduction-pipe. (Shown cut off, but to be connected in any suitable manner with the gas-burners.) Letter C represents the induction-pipe. (Shown cut off, but to be connected in any suitable manner with the gas-holder or source of supply.) The induction-pipe C connects with the variable chamber through the stop-cock F, letter *e′* being the gasway, and F′ the handle of the stop-cock.

The variable or movable part *c* of the variable chamber is acted on, antagonistically to the pressure of the gas admitted within the chamber, by the spring *a*, which is connected with the movable part by the rod *b*, and also with the stationary or rigid part of the chamber by the adjustable screw-plug *a′*, which is approachable from the exterior for the purpose of regulating the tension of the spring through the screw-hole D D, the orifice of which is closed gas-tight by the screw-stopper E and rubber packing-ring *e*. The handle of the stop-cock is connected to the rod *b*.

The action of the spring is to diminish the size of the variable chamber, and at the same time open the stop-cock. The force of the gas acts to extend the variable chamber and close the stop-cock. Therefore the tension of the spring must be sufficient to counterbalance such a degree of pressure of the gas admitted within the variable chamber as is necessary to keep up a proper average supply of gas to the burners, and the cock must be so adjusted in connection with the movable part of the variable chamber controlled by the spring, that by its action the cock will be kept open or partially open so long as the pressure of the gas within the chamber does not exceed the force of the spring, varying the opening in proportion to the degree of excess of pressure of the admitted gas over and above the force of the spring.

The precise manner in which a spring or its equivalent may be made to actuate the moving part of the variable chamber in antagonism to the pressure of the admitted gas is not a matter of importance so long as it is effectual and such movable part of a variable chamber is connected with a stop-cock through which the gas must pass on its way from the gas-holder or source of supply to the variable chamber.

I claim as my invention and improvement—

In gas-regulators a stop-cock situated in, and controlling the passage-way from the gas-holder or other source of supply to the variable chamber, in combination with the moving part of the variable chamber, substantially as described.

SALMON BIDWELL.

Witnesses:

CHRISTOPHER MCGAURAN,

JOSEPH PULLYN.